(12) United States Patent
Schön et al.

(10) Patent No.: US 12,209,678 B2
(45) Date of Patent: Jan. 28, 2025

(54) VALVE PLATE

(71) Applicant: VAT Holding AG, Haag (CH)

(72) Inventors: Mathias Schön, Salez (CH); Bernhard Litscher, Buchs (CH); Mario Moser, Meiningen (AT); Alen Franic, Feldkirch (AT); Gregor Beck, Schaan (LI)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/987,968

(22) Filed: Nov. 16, 2022

(65) Prior Publication Data
US 2023/0151891 A1 May 18, 2023

(30) Foreign Application Priority Data

Nov. 16, 2021 (DE) .......................... 102021129883.0

(51) Int. Cl.
 *F16K 3/314* (2006.01)
 *F16K 3/02* (2006.01)
 *F16K 3/18* (2006.01)
 *F16K 41/10* (2006.01)

(52) U.S. Cl.
 CPC ............ *F16K 3/314* (2013.01); *F16K 3/0218* (2013.01); *F16K 3/18* (2013.01); *F16K 41/10* (2013.01)

(58) Field of Classification Search
 CPC .......... F16K 3/314; F16K 3/0218; F16K 3/18; F16K 3/188; F16K 3/02; F16K 41/10; F16K 51/02; F16K 1/36; F16K 1/00; F16K 1/32; F16K 1/46; F16K 1/48; F16K 27/02
 See application file for complete search history.

(56) References Cited

U.S. PATENT DOCUMENTS

| 6,056,266 | A | 5/2000 | Blecha | |
|---|---|---|---|---|
| 8,827,241 | B2 * | 9/2014 | Geiser | F16K 3/188 251/193 |
| 10,520,109 | B2 * | 12/2019 | Hofer | F16K 51/02 |
| 10,876,637 | B2 * | 12/2020 | Blecha | F16K 51/02 |
| 2007/0272888 | A1 | 11/2007 | Tichy | |
| 2011/0108750 | A1 | 5/2011 | Ehrne et al. | |
| 2017/0204647 | A1 | 7/2017 | Ehrne | |
| 2018/0058591 | A1 * | 3/2018 | Bohm | F16K 31/5286 |
| 2018/0156340 | A1 * | 6/2018 | Kim | F16K 3/0254 |
| 2020/0400238 | A1 * | 12/2020 | Shimoda | F16K 3/184 |

FOREIGN PATENT DOCUMENTS

JP 202171186 5/2021

* cited by examiner

*Primary Examiner* — Craig J Price
*Assistant Examiner* — Andrew J Rost
(74) *Attorney, Agent, or Firm* — Volpe Koenig

(57) ABSTRACT

A valve plate has a plate portion with an elastomeric seal on a front face and an elongated connecting portion spaced apart from a rear face by a slot for fastening the valve plate to a valve rod. The extension of the connecting portion in the width direction is defined by opposing first and second side edges of the connecting portion when viewed in a plan view of the rear face of the plate portion. A connecting structure is configured in the connecting portion in a central region of the longitudinal extension of the first side edge of the connecting portion for connecting the connecting portion to an end portion of the valve rod. The connecting portion is reinforced in a region of its extension in the width direction adjoining the second side edge, relative to a region of its extension in the width direction adjoining the first side edge.

8 Claims, 7 Drawing Sheets

VALVE PLATE

INCORPORATION BY REFERENCE

The following documents are incorporated herein by reference as if fully set forth: German Patent Application No. 10 2021 129 883.0, filed Nov. 16, 2021.

TECHNICAL FIELD

The invention relates to a valve plate having a plate portion, a seal made of an elastomer material being attached thereto on a front face, and said plate portion having a longitudinal extension in a longitudinal direction which is greater than a width extension in a width direction located at right-angles to the longitudinal direction, and at least one elongated connecting portion for fastening the valve plate to at least one valve rod, wherein the at least one connecting portion is connected at its two ends spaced apart from one another in the longitudinal direction to the rear face of the plate portion opposing the front face, and is spaced apart from the plate portion in the region between its two ends, forming a slot located between the plate portion and the connecting portion, and wherein the extension of the at least one connecting portion in the width direction is defined by opposing first and second side edges of the connecting portion, when viewed in a plan view of the rear face of the plate portion, and wherein a connecting structure is configured in the connecting portion in a central region of the longitudinal extension of the first side edge of the at least one connecting portion for connecting the connecting portion to an end portion of the valve rod protruding from the first side edge of the connecting portion.

Systems for mounting valve plates on valve rods are known, said systems having a joint for a certain degree of pivotability of the valve plate about an axis located at right-angles to the valve rod. In the closed state of the vacuum valve, a more uniform pressing of the seal arranged on the front face of the valve plate can be achieved thereby, since it is possible to compensate for dimensional tolerances and elastic deformations, in particular a slight deflection of the valve rod in the closed state of the vacuum valve. Articulated connections in the vacuum region of the vacuum valve are, however, undesirable due to a production of particles in the surfaces which move relative to one another.

A valve plate of the type mentioned in the introduction is disclosed in US 2011/0108750 A1. An elongated connecting portion which is connected by its two ends to the plate portion is arranged on the rear face of a plate portion of the valve plate, which has the seal made of the elastomer material on the front face. Between the two ends, the connecting portion is spaced apart from the plate portion and a connecting structure is located in the longitudinal center of the connecting portion for connecting the connecting portion to an end portion of the valve rod, wherein an end portion of the valve rod is inserted in a recess of the connecting portion and is screwed therein. A certain pivoting of the valve plate relative to the valve rod is permitted by an elastic deformation of the connecting portion, in the form of a torsion of the connecting portion.

SUMMARY

It is the object of the invention to provide an advantageous valve plate of the type mentioned in the introduction in which the uniformity of the pressing of the elastic seal in the closed state of the vacuum valve is improved. This is achieved by a valve plate having one or more of the features disclosed herein.

According to the invention, the at least one connecting portion is configured to be reinforced in a region of its extension in the width direction adjoining the second side edge, relative to a region of its extension in the width direction adjoining the first side edge. The second side edge opposes the first side edge relative to the width direction, wherein the connecting structure is configured in a central region of the longitudinal extension of the first side edge for connecting the connecting portion to the end portion of the valve rod. In the state connected to the valve rod, the valve rod thus protrudes from the connecting portion in the first side edge of the connecting portion. A non-uniformity in the pressing of the seal, due to a certain deflection of the at least one valve rod in the closed state of the vacuum valve, can be at least reduced by the reinforcement of the connecting portion in the region of the second side edge.

The reinforcement of the connecting portion is advantageously achieved by the connecting portion having a greater thickness in the region of its extension in the width direction adjoining the second side edge than in the region of its extension in the width direction adjoining the first side edge.

In an advantageous embodiment of the invention, the at least one connecting portion has connecting arms which are configured in a plate-shaped manner and which run from the respective end of the connecting portion to the longitudinal center of the connecting portion. Preferably, a reinforcing web protrudes from the connecting arms in the direction of the plate portion of the valve plate, in a region of the extension of the connecting arm in the width direction adjacent to the second side edge, for forming the aforementioned reinforcement, wherein this reinforcing web is particularly preferably located directly on the second side edge of the connecting portion.

BRIEF DESCRIPTION OF THE DRAWINGS

Further advantages and details of the invention are explained hereinafter with reference to the accompanying drawing. In the drawings.

DETAILED DESCRIPTION

Figure 1:
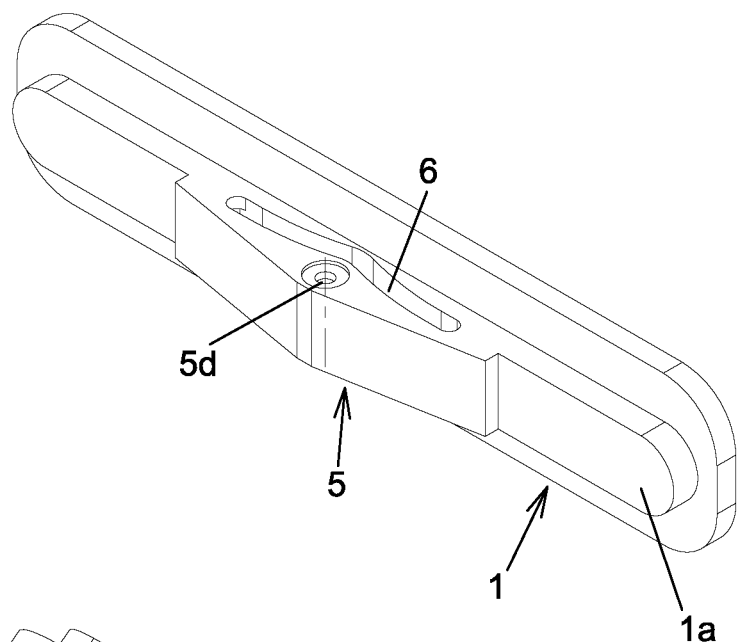
FIGS. 1 and 2 show perspective views of an exemplary embodiment of a valve plate according to the invention from different viewing directions.
Figure 2:
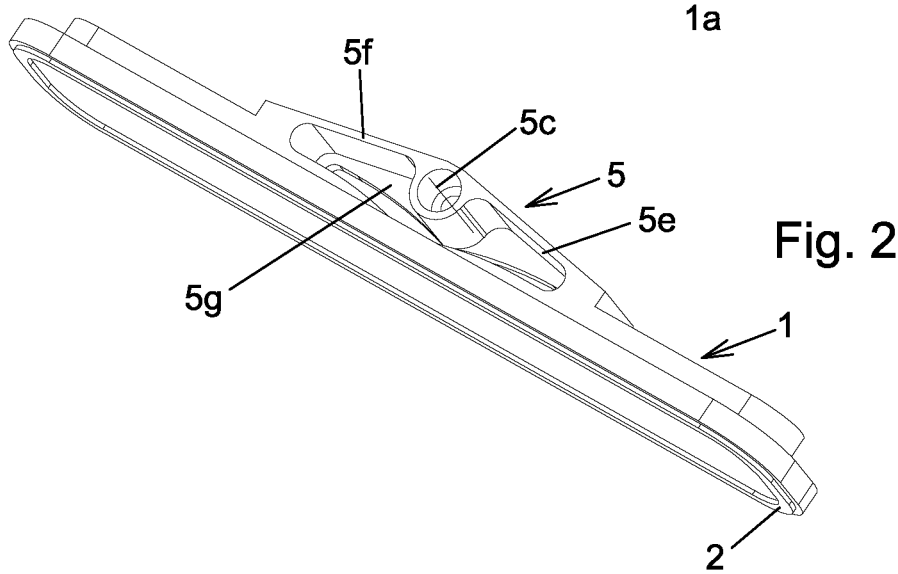
Figure 3:
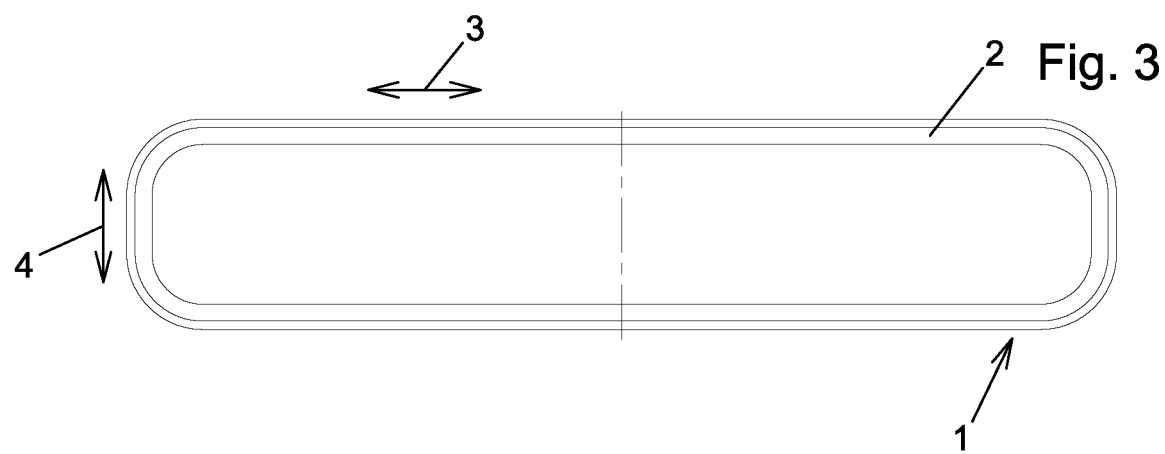
FIGS. 3 and 4 show a front and rear view.

An exemplary embodiment of a valve plate according to the invention is shown in FIGS. 1 to 10. The valve plate has a plate portion 1, an annular seal 2 made of an elastomer material being attached to the front face thereof which is preferably configured to be at least substantially planar. For example, the seal 2 can be vulcanized onto the plate portion 1. An O-ring received in a groove can also be provided.

The plate portion 1 has a length a which is greater than the width b, preferably more than double the size. The plate portion 1 thus has a longitudinal extension in a longitudinal direction 3 which is greater than a width extension in a width direction 4 located at right-angles to the longitudinal direction, preferably more than double the size.

The thickness of the plate portion 1 is substantially less than the width b, preferably less than half the size.

When viewed in a plan view of the front face of the plate portion 1, the plate portion in the exemplary embodiment has a right-angled contour with rounded corners, as is preferred.

An elongated connecting portion 5 serves for connecting the valve plate to a valve rod. The connecting portion 5 thus has a greater extension in the longitudinal direction 3 than in the width direction 4. Preferably, the longitudinal extension of the connecting portion 5 is more than double the size of the width extension.

The connecting portion 5 is connected only at its two ends spaced apart from one another in the longitudinal direction 3 to the rear face of the plate portion 1 opposing the front face. In the exemplary embodiment, in this case an elongated reinforcing rib 1a is configured on the rear face of the plate portion 1, the plate portion having a greater thickness in the region of said reinforcing rib and said reinforcing rib running in the longitudinal direction 3. The reinforcing rib 1a forms a step-shaped elevation on the rear face of the plate portion 1. The two ends of the connecting portion 5 are connected to the plate portion 1 in the region of the reinforcing rib 1a.

The reinforcing rib 1a could also be dispensed with, so that the plate portion could also be configured to be at least substantially planar on the rear face. The plate portion could then have a slightly greater thickness overall if required.

In the region between the two ends of the connecting portion 5 this connecting portion is spaced apart from the plate portion 1, whereby a slot 6 is configured between the plate portion 1 and the connecting portion 5.

In particular, the connecting portion 5 is located with its longitudinal extension parallel to the longitudinal direction 3 and runs in the width direction 4 in the region of the center of the extension of the plate portion.

In the exemplary embodiment, the plate portion 1 and the connecting portion 5 are configured to be made of the same material with one another and form a metal base body of the valve plate. Alternatively, a configuration consisting of a plurality of parts and a material connection could also be provided. Thus, for example, the connecting portion 5 could be configured as a separate part which is welded with its two ends onto the plate portion 1. A screw connection of the two ends of the connecting portion 5 to the plate portion 1 is also conceivable and possible.

Figure 4:
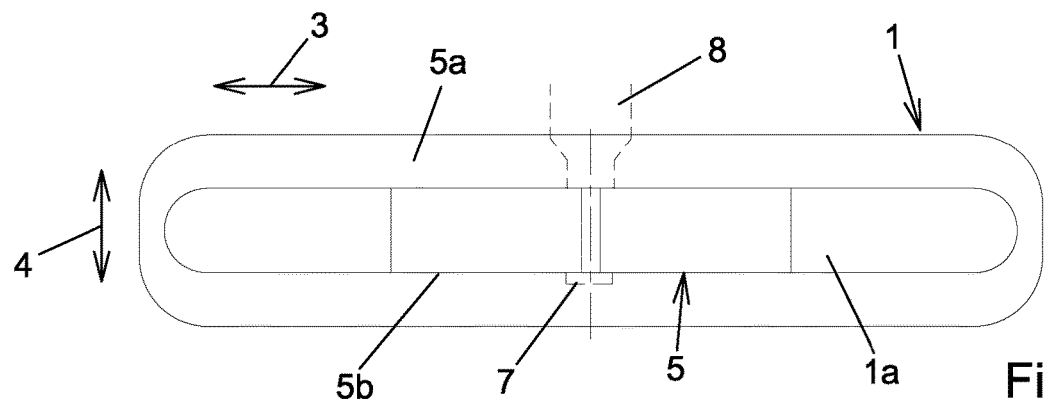
Figure 5:
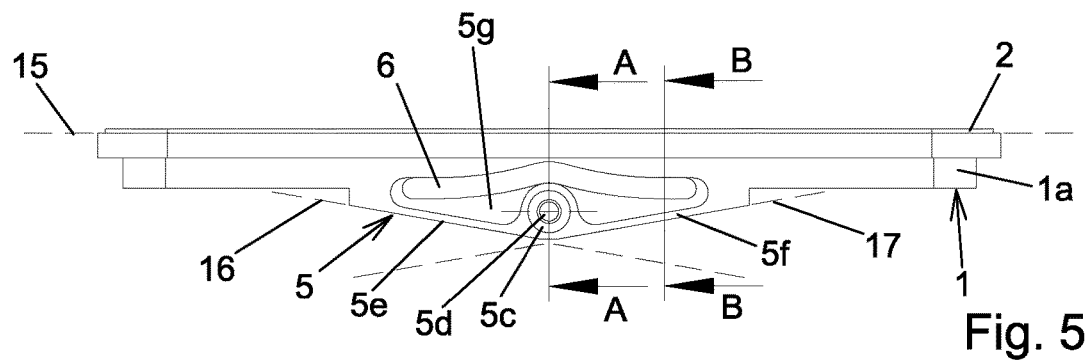
FIGS. 5 and 6 show side views of opposing narrow sides of the valve plate running longitudinally.
Figure 6:
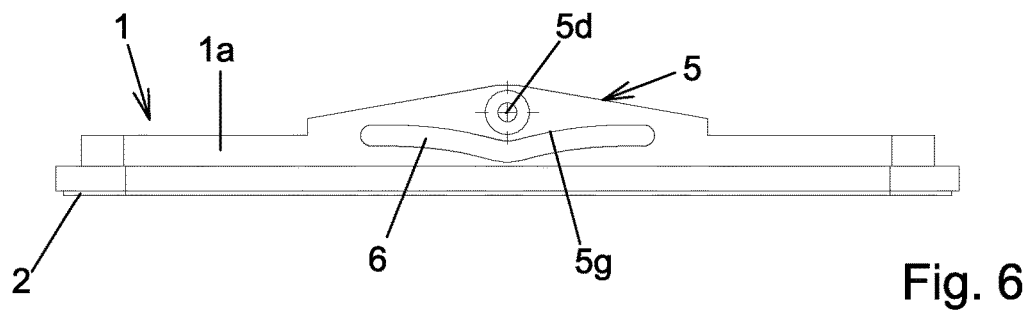
Figure 7:
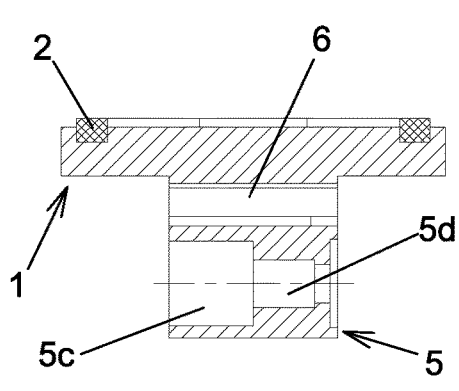
FIGS. 7 and 8 show sections along the lines A-A and B-B of FIG. 5.
Figure 8:
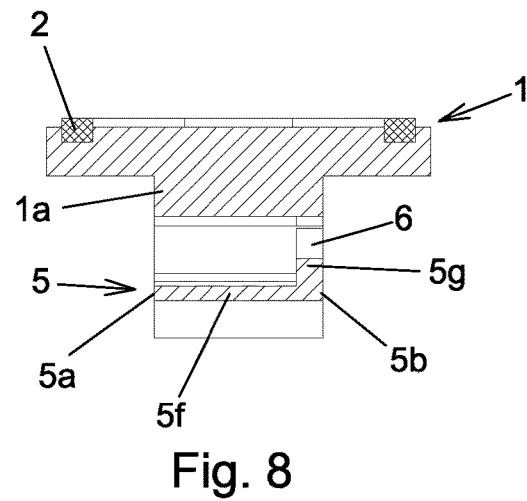
Figure 9:
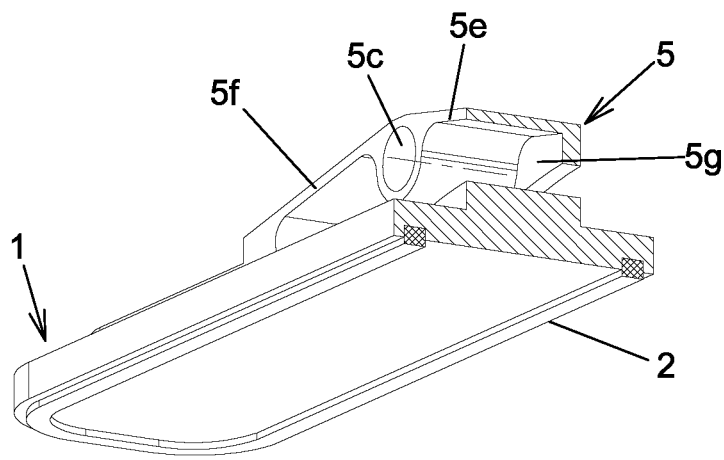
FIGS. 9 and 10 show three-dimensional views of the valve plate in cross section from different viewing directions.
Figure 10:
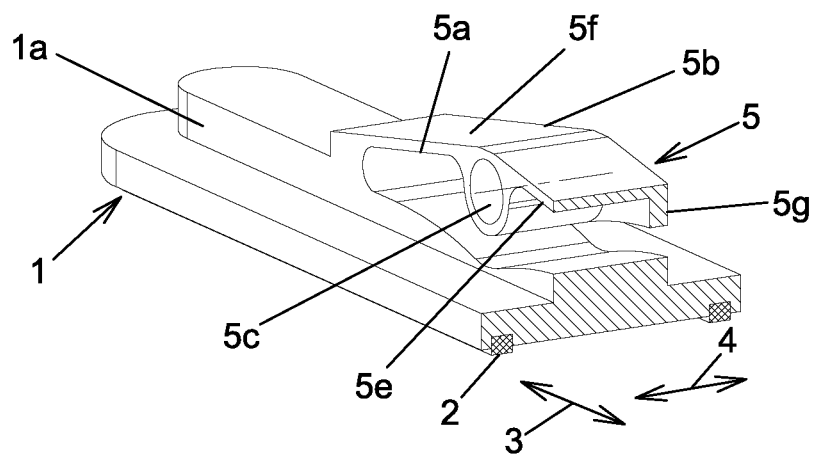
Figure 11:
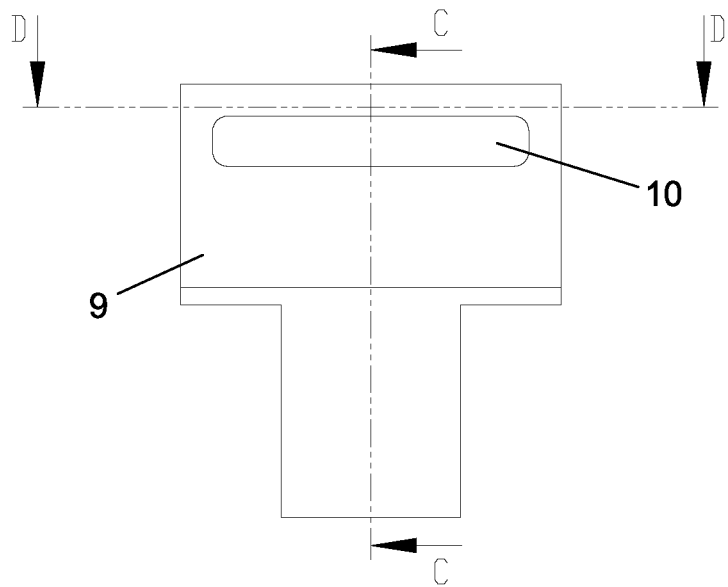
FIG. 11 shows a simplified view of a vacuum valve having a valve plate according to the invention according to the exemplary embodiment shown in FIGS. 1-10.
Figure 13:
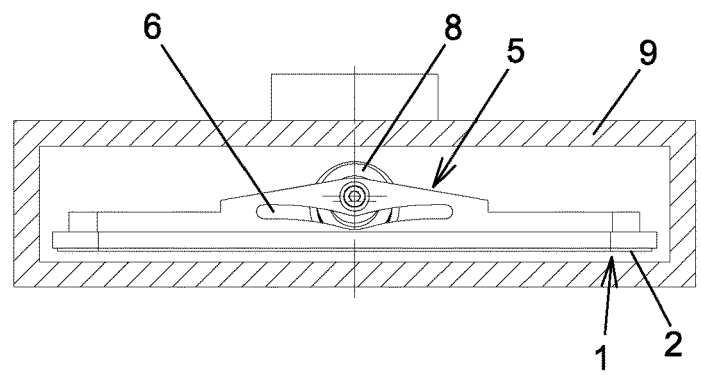
FIGS. 12 and 13 show sections along the lines C-C and D-D of FIG. 11 (in the open state of the vacuum valve)
Figure 12:
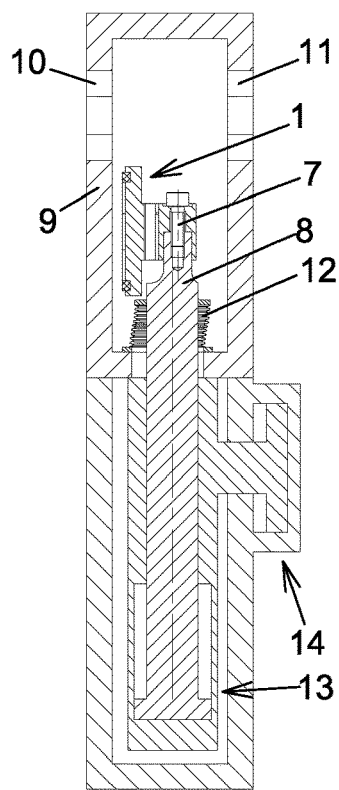
Figure 14:
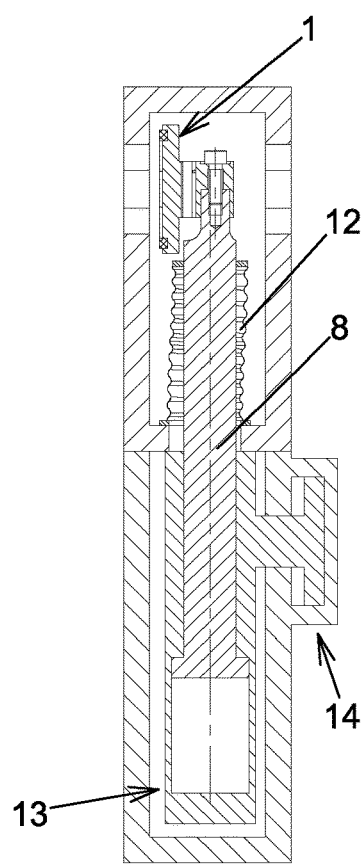
FIG. 14 shows a section similar to FIG. 12 in the central position.
Figure 15:
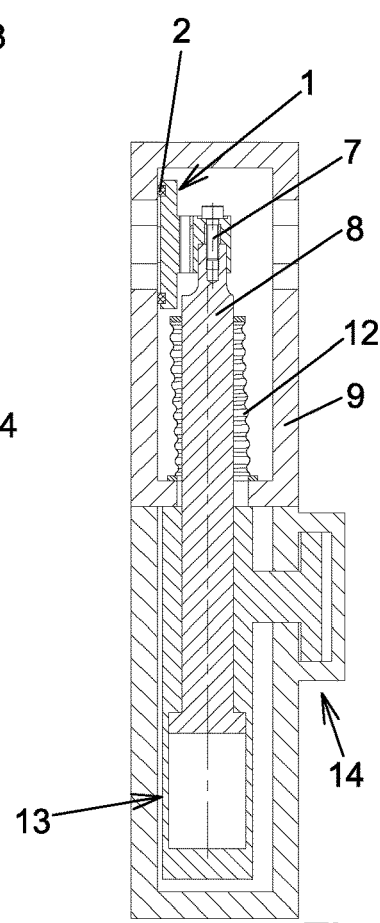
FIG. 15 shows a section similar to FIG. 12 in the closed state of the vacuum valve.
Figure 16:
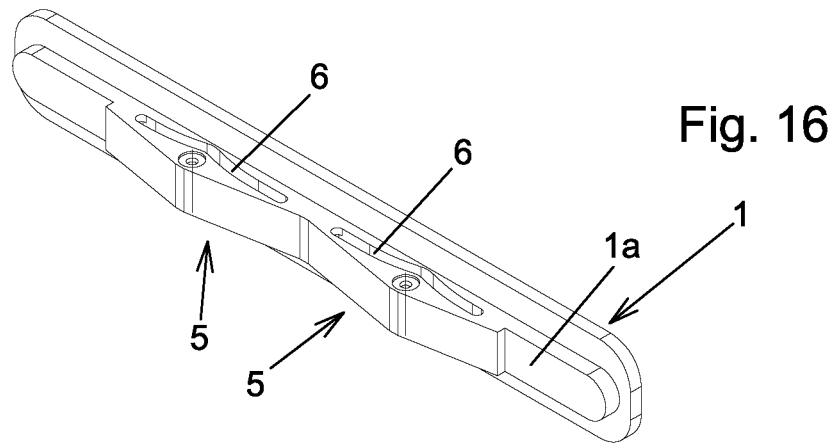
FIGS. 16 to 21 show views similar to FIGS. 1 to 4 of a second exemplary embodiment of the invention.
Figure 17:
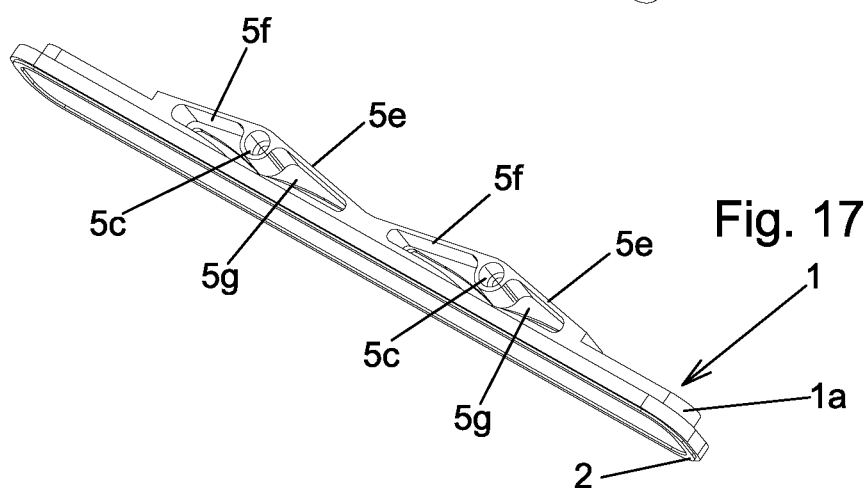
Figure 18:
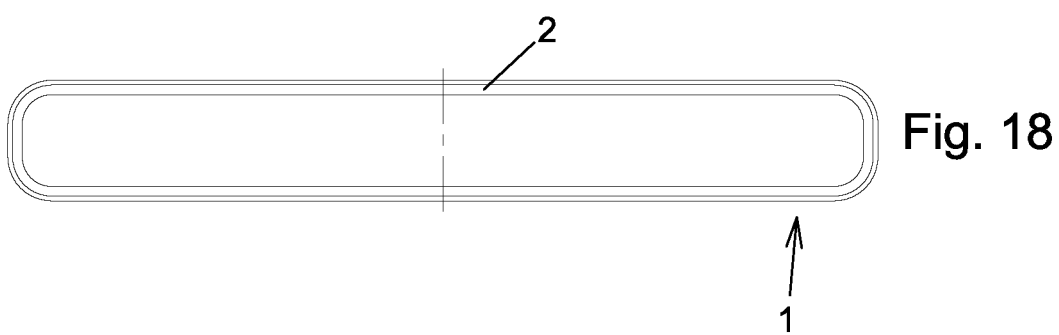
Figure 19:
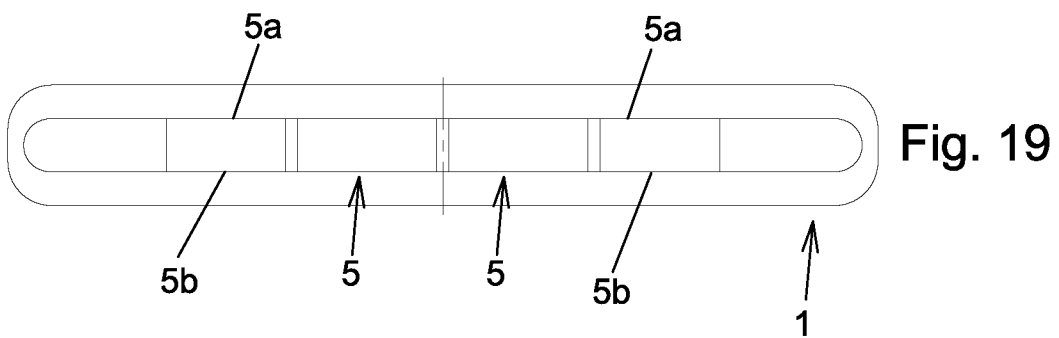
Figure 20:
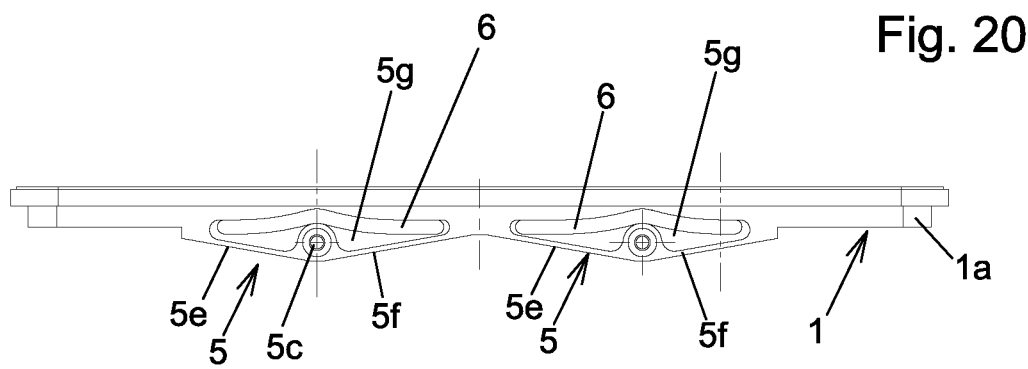
Figure 21:
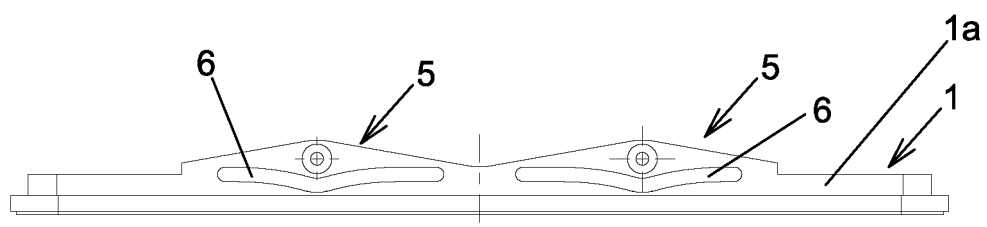

When viewed in a plan view of the rear face of the plate portion 1 (=a plan view of the rear face of the valve plate) the extension of the connecting portion 5 in the width direction 4 is defined by opposing first and second side edges 5a, 5b see FIG. 4. A connecting structure 5c is configured in the connecting portion 5 in a central region of the longitudinal extension of the first side edge 5a. This connecting structure serves for connecting to the end portion of a valve rod. To this end, the connecting structure 5c is oriented in the width direction 4. In the exemplary embodiment, the connecting structure is configured in the form of a recess in the narrow side (=edge surface) located in the first side edge 5a of the connecting portion 5. The valve rod 8 is inserted with its end portion into this recess. In FIG. 4 a part of the valve rod connected to the connecting portion 5 is indicated by dashed lines.

In the bottom of the recess is located a bore 5d which extends to the narrow side (=edge surface) located on the second side edge 5b of the connecting portion. A fastening screw 7 (also indicated in FIG. 4 by dashed lines) can be screwed through this bore into a thread on the end of the valve rod. The valve rod 8 which is connected to the valve plate then protrudes from the connecting portion 5 in the first side edge 5a as is visible from FIG. 4.

The connecting portion 5 has two connecting arms 5e, 5f which are configured to be plate-shaped and which run from the respective end of the connecting portion 5 to the longitudinal center of the connecting portion and which are connected together there via a thickening in which the connecting structure 7 is configured, in the exemplary embodiment integrally formed from the same material. The thickness of the connecting arms 5e, 5f is thus substantially less than the length thereof and the width thereof.

In the exemplary embodiment, the plate-shaped connecting arms 5e, 5f are located in planes 16, 17 which enclose with the front face of the plate portion 1, which is located in one plane 15, an angle of less than 20°, wherein the connecting arms 5e, 5f extend away from the front face of the plate portion 1 (see FIG. 5), starting from the respective end of the connecting portion 5 to the longitudinal center of the connecting portion.

The connecting portion 5 also has a reinforcing web 5g which protrudes from the plate-shaped connecting arms 5e, 5f in the direction of the plate portion 1. In this case the reinforcing web 5g is located in a region of the connecting portion adjacent to the second side edge 5b. When viewed in cross section, see FIG. 8 and FIGS. 9 and 10, the reinforcing web 5g protrudes at right-angles to the connecting arms 5e, 5f. The connecting portion 5 is reinforced by the reinforcing web 5g, thus in a region of its extension in the width direction adjoining the second side edge 5b, relative to a region of its extension in the width direction adjoining the first side edge 5a. The reinforcement is thus located in the region of that half of the extension of the connecting portion 5 in the width direction 4 which adjoins the second side edge 5b, in the exemplary embodiment directly on the second side edge 5b.

In the exemplary embodiment, the reinforcing web 5g is located in a plane which is at right-angles to the plane 15 in which the front face of the plate portion 1 is located.

In modified exemplary embodiments, the reinforcement of the connecting portion could also be configured differently in a region adjoining the second side edge 5b thereof, in particular by a greater thickness of the connecting portion 5 in this region. For example, the connecting arms 5e, 5f could have steps running in the longitudinal direction thereof, whereby the thickness of the connecting arms 5e, 5f in a region adjoining the second side edge 5b is increased relative to a region adjoining the first side edge 5a.

A simplified, partially schematic view of a vacuum valve which has a valve plate according to the invention emerges from FIGS. 11 to 15. The valve plate is fastened by means of the fastening screw 7 to a valve rod 8. The valve plate and a portion of the valve rod 8 adjoining the valve plate are located in an interior of a valve housing 9. In the open state of the vacuum valve, the valve plate opens up a valve opening 10 and thus a through-passage through the valve housing 9 between the valve opening 10 and an opposing opening 11, see FIG. 12. In the closed state of the vacuum valve, the valve opening 10 is closed and sealed by the valve plate, see FIG. 15.

The valve rod 8 is guided out of the interior of the valve housing 9 in a sealed manner, for example by means of a folding bellows 12. For opening and closing the vacuum valve, the valve rod 8 is moved by means of a valve drive located outside the vacuum region. To this end, a longitudinal drive 13 and a transverse drive 14 are shown schematically in the figures. Starting from the open state of the vacuum valve, the valve rod 8 is displaced by means of the longitudinal drive 13 in the longitudinal direction thereof until the valve plate opposes the valve opening 10 but is still lifted away therefrom, see FIG. 14. Starting from this intermediate position, the valve rod 8 and thus also the valve plate are displaced by means of the transverse drive 14 in a direction at right-angles to the longitudinal axis of the valve rod, whereby the seal 2 of the valve plate is pushed against a valve seat surrounding the valve opening 10 on the inner face of the valve housing 9. The valve seat is formed by a sealing surface.

A vacuum valve having a valve plate according to the invention could also be configured in modified form. For example, a pivoting of the valve rod 8 about a pivot axis located at right-angles to the longitudinal axis of the valve rod could also be provided in order to close the vacuum valve starting from the intermediate position.

The connecting structure and the end of the valve rod cooperating therewith could also have a modified configuration. A positive anti-rotation device could also be configured between the connecting structure and the valve rod, for example the valve rod could have a protruding ridge which runs in the longitudinal direction thereof and which engages in a corresponding groove in the wall of the recess forming the connecting structure.

When the valve plate is pushed against the valve seat, it leads to a certain deflection of the valve rod 8. The angular position of the valve plate relative to the valve seat can be adapted in this case by a deformation of the connecting portion 5. This deformation of the connecting portion 5, in particular, is a torsion of the connecting portion. By the reinforcement of the connecting portion 5 in a region of the extension of the connecting portion in the width direction 4 adjoining the second side edge 5b, in this case it can be achieved that the pressing of the longitudinal limb of the seal 2, which is located on the side of the valve plate remote from the valve drive, is increased relative to a configuration of the connecting portion without such a reinforcement. As a result, the pressing of this longitudinal limb of the seal 2 remote from the valve drive can be adapted to the longitudinal limb of the seal 2 located closer to the valve drive.

The reinforcement of the connecting portion 5 of the valve plate is thus located in the half of the extension of the connecting portion 5 remote from the valve drive in the width direction 4.

A second exemplary embodiment of a valve plate according to the invention is shown in FIGS. 16-21. The differences from the first exemplary embodiment are described hereinafter. The description of the first exemplary embodiment can also be used in a similar manner.

In this second exemplary embodiment of the invention, two connecting portions 5 which are located adjacent to one another relative to the longitudinal extension of the plate portion 1 are present. The valve plate of this exemplary embodiment is thus provided for fastening to two spaced-apart valve rods 8. In this case the two connecting portions 5 are preferably configured to be the same. In the second exemplary embodiment shown, each of the two connecting portions 5 is configured to be the same as the individual connecting portion 5 of the first exemplary embodiment.

The ends of the two connecting portions 5 which face one another are fastened in the region of the longitudinal center of the plate portion 1 to the rear face thereof. In this exemplary embodiment, the connecting portions 5 and the plate portion 1 are in turn configured to be integrally formed from the same material, as is preferred.

Figure 22:
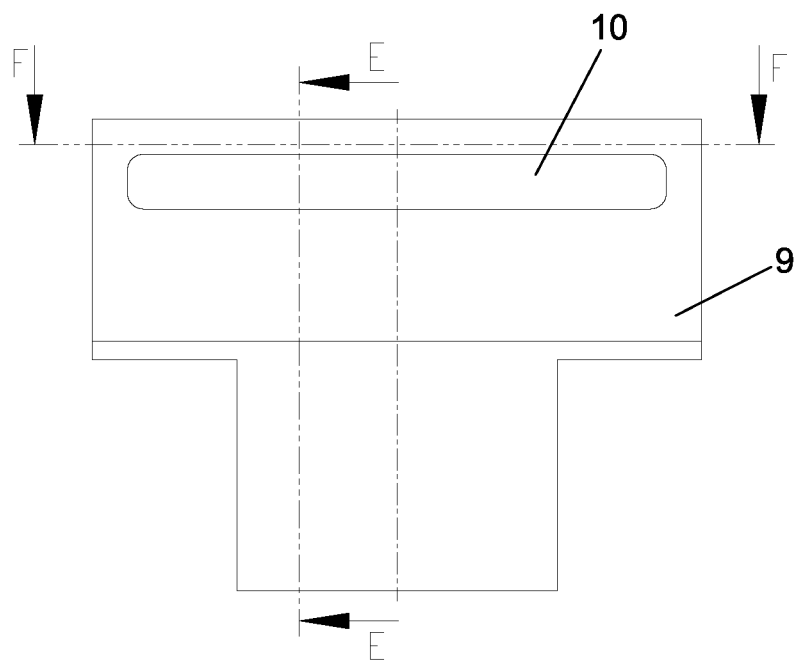
FIG. 22 shows a view similar to FIG. 11.
Figure 23:
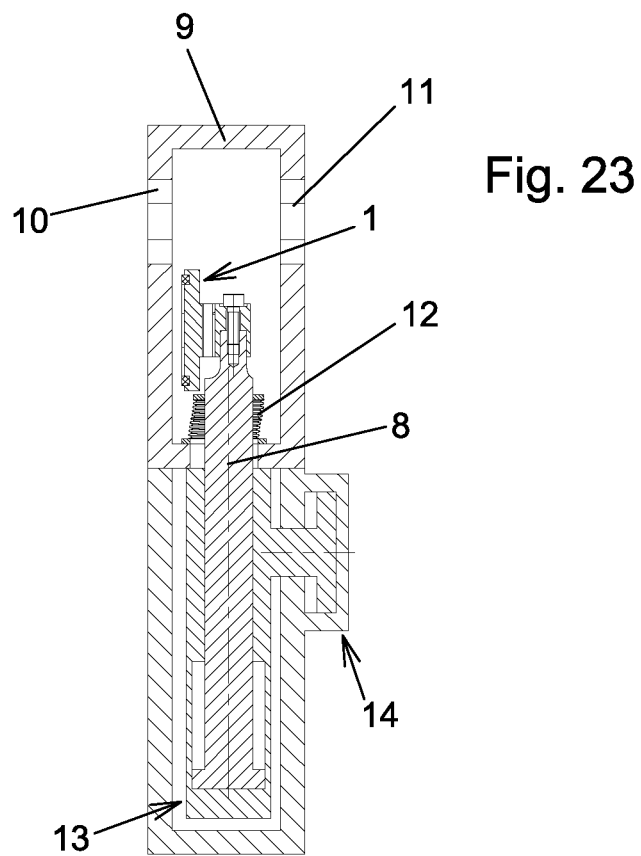
FIGS. 23 and 24 show sections along the lines E-E and F-F of FIG. 22 for the second exemplary embodiment.
Figure 24:
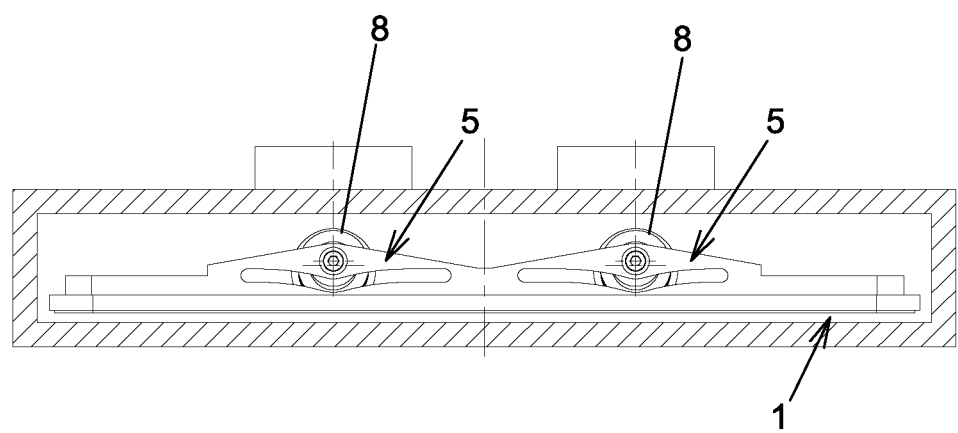

A vacuum valve, in which the valve plate according to this second exemplary embodiment is used, is shown in FIGS. 22-24. The configuration corresponds to that of the first exemplary embodiment except that two spaced-apart valve rods 8, to which the valve plate is fastened, are present. In each case, the valve rods are adjustable in the longitudinal direction and in a transverse direction located at right-angles to the longitudinal direction, in order to close and to open the vacuum valve. To this end, in the exemplary embodiment the valve drive has separate longitudinal drives 13 and transverse drives 14 for each of the valve rods. A common longitudinal drive 13 and/or a common transverse drive 14 could also be present for the valve rods. Instead of a displacement of the valve rods in the transverse direction, in turn a tilting of the valve rods about an axis located at right-angles to the longitudinal axis of the valve rods could also be provided.

LEGEND FOR THE REFERENCE NUMERALS

1 Plate portion
1a Reinforcing rib
2 Seal
3 Longitudinal direction
4 Width direction
5 Connecting portion
5a First side edge
5b Second side edge
5c Connecting structure
5d Bore
5e Connecting arm
5f Connecting arm
5g Reinforcing web
6 Slot
7 Fastening screw
8 Valve rod
9 Valve housing
10 Valve opening
11 Opening
12 Folding bellows
13 Longitudinal drive
14 Transverse drive
15 Plane
16 Plane
17 Plane

The invention claimed is:
1. A valve plate comprising:
a plate portion;

a seal made of an elastomer material being attached to a front face of the plate portion;

said plate portion having a longitudinal extension in a longitudinal direction which is greater than a width extension in a width direction located at right-angles to the longitudinal direction;

a connecting portion for fastening the valve plate to a valve rod, the connecting portion is connected at two ends thereof spaced apart from one another in the longitudinal direction to a rear face of the plate portion, which is opposite to the front face, and is spaced apart from the plate portion in a region between its two ends, forming a slot located between the plate portion and the connecting portion;

an extension of the connecting portion in the width direction is defined by opposing first and second side edges of the connecting portion, when viewed in a plan view of the rear face of the plate portion;

a connecting structure is configured in the connecting portion in a central region of the longitudinal extension of the first side edge of the connecting portion for connecting the connecting portion to an end portion of the valve rod protruding from the first side edge of the connecting portion;

a respective plate-shaped connecting arm of the connecting portion extends from each of the longitudinal ends of the connecting portion to the central region of the longitudinal extension of the connecting portion; and the connecting structure comprises a respective reinforcing web which protrudes from each of the connecting arms in a direction towards the plate portion of the valve plate, the reinforcing web extending only in that half of the extension of the connecting portion in the width direction which adjoins the second side edge, and the reinforcing web reinforces the connecting portion in a region of the extension of the connecting portion in the width direction adjoining the second side edge, relative to the region of the extension of the connecting portion in the width direction adjoining the first side edge.

2. The valve plate according to claim 1, wherein the reinforcing web is located directly on the second side edge.

3. The valve plate according to claim 1, wherein the reinforcing web is located in a plane which is at right-angles to the front face of the plate portion.

4. The valve plate according to claim 1, wherein the plate-shaped connecting arms are located in planes which enclose with the front face of the plate portion, which is located in one plane, in each case an angle of less than 20°, and said planes extend away from the front face of the plate portion, starting from the respective end of the connecting portion to the longitudinal center of the connecting portion.

5. The valve plate according to claim 1, wherein the connecting structure has a recess in the connecting portion for receiving the end portion of the valve rod.

6. The valve plate according to claim 1, wherein the plate portion has a reinforcing rib extending in the longitudinal direction on the rear face of the plate portion, and the two ends of the connecting portion are connected to said reinforcing rib.

7. The valve plate according to claim 1, wherein the connecting portion of the valve plate is deformable via a torsion relative to the plate portion, to permit an adaptation of the angular position of the plate portion of the valve plate relative to a valve seat when the valve plate is pushed against the valve seat.

8. A vacuum valve comprising the valve plate according to claim 1, a valve rod connected to the valve plate, and a valve drive that adjusts the valve rod for opening and closing the vacuum valve.

\* \* \* \* \*